United States Patent
Uryu et al.

(10) Patent No.: US 6,953,183 B2
(45) Date of Patent: Oct. 11, 2005

(54) PROPORTIONAL SOLENOID VALVE

(75) Inventors: Takuya Uryu, Tokyo (JP); Yuta Ichinose, Tokyo (JP); Yoshihiko Onishi, Tokyo (JP); Kenji Nakao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 57 days.

(21) Appl. No.: 10/678,307

(22) Filed: Oct. 6, 2003

(65) Prior Publication Data

US 2004/0206923 A1 Oct. 21, 2004

(30) Foreign Application Priority Data

Apr. 18, 2003 (JP) ........................................ 2003-114670

(51) Int. Cl.⁷ ............................................. F16K 31/02
(52) U.S. Cl. .......................... 251/129.08; 251/129.14; 251/363
(58) Field of Search ....................... 251/129.08, 129.15, 251/129.14, 363

(56) References Cited

U.S. PATENT DOCUMENTS

| | | | | |
|---|---|---|---|---|
| 2,863,473 A | * | 12/1958 | Gantz ........................... | 251/363 |
| 3,231,233 A | * | 1/1966 | Herion ......................... | 251/363 |
| 5,145,146 A | * | 9/1992 | Matsushima ................ | 251/363 |
| 5,344,118 A | * | 9/1994 | Kamiya et al. ............. | 251/356 |
| 6,113,066 A | * | 9/2000 | Hohl et al. ............. | 251/129.15 |
| 6,168,135 B1 | * | 1/2001 | Fochtman ............... | 251/129.15 |
| 6,529,106 B1 | * | 3/2003 | Linhoff et al. ......... | 251/129.15 |
| 6,637,724 B1 | * | 10/2003 | Mayer .................... | 251/129.15 |
| 6,644,623 B1 | * | 11/2003 | Voss et al. ............. | 251/129.15 |
| 6,705,589 B2 | * | 3/2004 | Hofmann et al. ...... | 251/129.08 |
| 6,719,267 B2 | * | 4/2004 | Torii et al. ............. | 251/129.15 |

FOREIGN PATENT DOCUMENTS

| | | |
|---|---|---|
| DE | 196 25 262 A1 | 1/1998 |
| DE | 197 00 979 A1 | 7/1998 |
| DE | 198 48 919 A1 | 4/2000 |
| DE | 199 10 207 A1 * | 9/2000 |
| DE | 199 36 711 A1 * | 1/2001 |
| DE | 100 47 399 A1 | 4/2002 |
| DE | 101 41 134 A1 | 7/2002 |
| JP | 2000-65233 A | 3/2000 |
| JP | 2002-188744 A | 7/2002 |
| JP | 2002-525524 A | 8/2002 |

* cited by examiner

*Primary Examiner*—John Bastianelli
(74) *Attorney, Agent, or Firm*—Sughrue Mion, PLLC

(57) ABSTRACT

In a proportional solenoid valve, a solenoid main body includes a coil, a valve seat member having a seat portion, a valve element that is displaced in accordance with a current applied to the coil so as to be brought into and out of contact with the seat portion, and a valve guide portion that is arranged coaxially with the seat portion and guides the displacement of the valve element. The housing is attached to the solenoid main body so that a space is formed between the housing and the valve seat member. A seal member made of an elastic material is provided in the space between the housing and the valve seat member.

4 Claims, 3 Drawing Sheets

PROPORTIONAL SOLENOID VALVE

BACKGROUND OF THE INVENTION

1. Field of the Invention

The present invention relates to a proportional solenoid valve in which a valve element is displaced by applying a current to a solenoid to obtain an output pressure which is proportional to the value of the applied current.

2. Description of the Related Art

In a conventional proportional solenoid valve, a valve element is displaced while being guided by a valve guide portion that is provided for a solenoid main body. Also, a valve seat member having a seat portion, which the valve element is brought into and out of contact with, is fixed to a housing coupled to the solenoid main body (see JP 2002-525524 A, for instance).

As described above, in the conventional proportional solenoid valve, the valve element is provided on the solenoid main body side and the seat portion is provided on the housing side, so that an error occurs in the coupling position of the housing with reference to the solenoid main body due to machining tolerances of the coupling portion between the solenoid main body and the housing. As a result, coaxiality between the valve element and the seat portion is lowered. Also, when the housing is welded to the solenoid main body, a distortion occurs in the housing, which causes a positional shift of the valve element with reference to the seat portion. The influence of the distortion varies depending on welding conditions such as the amount of welding heat and a welding range, so that it is difficult to manage the positional shift. Further, when the housing is made of a resin, the positional shift of the valve element with reference to the seat portion occurs also due to deformation of the housing resulting from operating temperature.

SUMMARY OF THE INVENTION

The present invention has been made in order to solve the above-mentioned problems, and provides a proportional solenoid valve which is capable of improving accuracy of positional shift of a valve element with reference to a seat portion.

A proportional solenoid valve according to the present invention includes a solenoid main body, a housing, and a seal member. The solenoid main body includes a coil, a valve seat member having a seat portion, a valve element that is displaced in accordance with a current applied to the coil so as to be brought into and out of contact with the seat portion, and a valve guide portion that is arranged coaxially with the seat portion and guides the displacement of the valve element. The housing is attached to the solenoid main body so that a space is formed between the housing and the valve seat member. The seal member is made of an elastic material and is provided in the space between the housing and the valve seat member. The valve seat member is attached to the valve guide portion, thereby making it possible to improve positional accuracy of the valve element with reference to the seat portion.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will now be described with reference to the accompanying drawings.

First Embodiment

Figure 1:
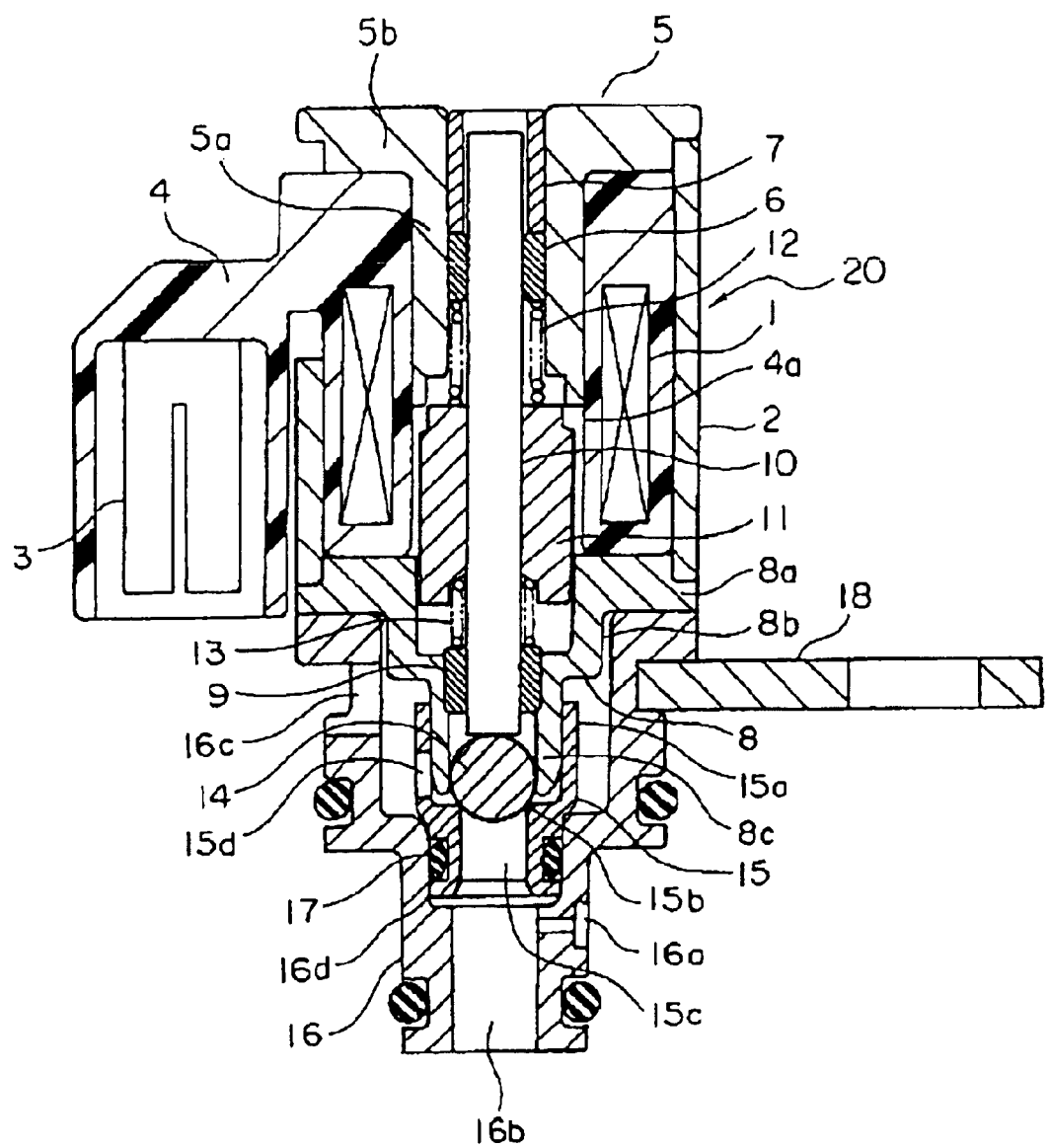
FIG. 1 is a cross-sectional view of a proportional solenoid valve according to a first embodiment of the present invention.

FIG. 1 is a cross-sectional view of a proportional solenoid valve according to a first embodiment of the present invention. Note that in the drawing, a proportional solenoid valve of normally high type is illustrated.

In FIG. 1, a coil 1 is accommodated in a cylindrical case 2 made of metal and a terminal 3 for connecting the coil 1 to a power supply is arranged outside of the case 2. The coil 1 and the terminal 3 are molded by a resin portion 4. A plunger accommodating cavity 4a that extends in the axial direction of the coil 1 to pass through the coil 1 is provided in the resin portion 4.

To one end portion of the resin portion 4, a core 5 made of metal is coupled. This core 5 includes a cylinder portion 5a inserted into one end portion of the plunger accommodating cavity 4a and a flange portion 5b that is abutted against an end surface of the resin portion 4. The flange portion 5b is welded to the case 2 at the outer periphery of its joining surface with the case 2.

A first plain bearing 6 is inserted into the cylinder portion 5a. Also, a cylindrical adjuster 7 is press-fitted into the cylinder portion 5a.

To the other end portion of the resin portion 4, a guide member 8 made of metal is coupled. This guide member 8 includes an annular-shaped flange portion 8a abutted against an end surface of the resin portion 4, a cylindrical fit portion 8b that protrudes from the flange portion 8a, and a cylindrical valve guide portion 8c that extends from one end portion of the fit portion 8b. The flange portion 8a is welded to the case 2 at the outer periphery of its joining surface with the case 2. The diameter of the valve guide portion 8c is smaller than the diameter of the fit portion 8b.

A second plain bearing 9 is fixed into the valve guide portion 8c. Into the first plain bearing 6 and the second plain bearing 9, a rod 10 is inserted so as to be slidable. This rod 10 is arranged inside of the core 5, the plunger accommodating cavity 4a, and the guide member 8 so as to be capable of reciprocating in the axial direction of the coil 1.

To the middle portion of the rod 10, a cylindrical plunger 11 is fixed. That is, the rod 10 is press-fitted into the plunger 11. A first spring 12 is arranged between the plunger 11 and the first plain bearing 6, while a second spring 13 is arranged between the plunger 11 and the second plain bearing 9. The plunger 11 is capable of reciprocating integrally with the rod 10 inside of the plunger accommodating cavity 4a.

A ball-shaped valve element 14 is inserted into the valve guide portion 8c. A tip portion of the rod 10 is abutted against the valve element 14. The load of the first spring 12 energizing the plunger 11 toward the valve element 14 is adjusted by the press-fit position of the adjuster 7. The valve guide portion 8c is press-fitted into and is fixed to a valve seat member 15. The valve seat member 15 includes a cylindrical fixing portion 15a into which the valve guide portion 8c is press-fitted, a seat portion 15b which the valve element 14 is brought into and out of contact with, an input/output-side oil passage 15c, and a drain-side oil passage 15d.

To the guide member 8, a housing 16 that forms a flow path for oil (oil passage) is attached. This housing 16 is welded to the flange portion 8a at the outer periphery of its joining surface with the flange portion 8a. Also, the housing 16 includes an input portion 16a, an output portion 16b, and a drain port 16c.

The output port 16b communicates with the input/output-side oil passage 15c, and the drain port 16c communicates with the drain-side oil passage 15d. Also, the housing 16 is provided with a valve seat insertion portion 16d into which an end portion of the valve seat member 15 is inserted. Between the inner peripheral surface of the valve seat insertion portion 16d and the valve seat member 15, a space having a predetermined size is provided, and a seal member 17, such as an O-ring made of an elastic material, is provided in the space.

Here, the space between the valve seat member 15 and the housing 16, in which the seal member 17 is placed, is set with consideration given to machining accuracy of the valve seat member 15 and the housing 16, the space between the guide member 8 and the housing 16 in the radius direction of their coupling portion, thermal expansion of the valve seat member 15 and the housing 16 due to an operating temperature, and the like. When the diametral space between the guide member 8 and the housing 16 is set at around 0.1 mm, for instance, the space between the valve seat member 15 and the housing 16 is set larger than the diametral space by around 0.1 mm, that is, at around 0.2 mm.

Also, the case 2, the core 5, the guide member 8, and the plunger 11 collectively constitute a magnetic circuit. The core 5 functions as a magnetic attraction portion for the plunger 11. A solenoid main body 20 in the first embodiment includes the coil 1, the case 2, the terminal 3, the resin portion 4, the core 5, the first plain bearing 6, the adjuster 7, the guide member 8, the second plain bearing 9, the rod 10, the plunger 11, the first spring 12, the second spring 13, the valve element 14, and the valve seat member 15. To the housing 16, a flange member 18 for attachment is fixed.

Next, an operation in this embodiment will be described. Under a state where the coil 1 is not excited, the plunger 11 is pressed to the valve element 14 side by the spring force of the first spring 12. Consequently, the valve element 14 is pressed against the seat portion 15b by the rod 10, and the oil flow path to the drain port 16c is closed. As a result, a high-pressure output is obtained from the output port 16b.

When the coil 1 is excited and an electromagnetic force attracting the plunger 11 exceeds a predetermined degree, the plunger 11 and the rod 10 are displaced in opposition to the spring force of the first spring 12 in a direction in which distances of the plunger 11 and the rod 10 from the seat portion 15b are increased. At that time, oil pressure acts on the valve element 14, so that the valve element 14 is displaced within the valve guide portion 8c along with the rod 10. As a result, the valve element 14 is spaced from the seat portion 15b, an amount of oil corresponding to the opening degree is output to the drain port 16c side, and the pressure output from the output port 16b is reduced. The valve element 14 is displaced in accordance with the value of a current applied to the coil 1 and an output proportional to the current value is obtained from the output port 16b.

In this proportional solenoid valve, the valve seat member 15 is attached to the valve guide portion 8c, so that it becomes possible to improve the positional accuracy of the valve element 14 with reference to the seat portion 15b by eliminating the influence of a positional shift between the guide member 8 and the housing 16 and a distortion of the housing 16. As a result, coaxiality between the valve guide portion 8c and the valve seat member 15 and perpendicularity between the valve guide portion 8c and the seat portion 15b are improved, which makes it possible to improve seatability and stability of output characteristics. Further, it becomes possible to increase machining tolerances of the coupling portion between the solenoid main body 20 and the housing 16.

Also, the housing 16 is a component whose function is only to form an oil path, which makes it possible to deal with this housing 16 as a component that exerts no influence on the seatability and the output characteristics. As a result, it becomes possible to increase flexibility concerning the shape and material of the housing 16, which contributes to cost reduction. Also, even when the housing 16 is made of a resin and is deformed due to operating temperatures, it becomes possible to prevent the positional shift of the valve member 14 with reference to the seat portion 15b. Further, even when the proportional solenoid valve according to the present invention is attached to transmissions (electronically controlled automatic transmissions for automobiles) having different attachment specifications, for instance, it becomes possible to cope with such various transmissions merely by changing the shape and material of the housing 16 while achieving commonality of components on the solenoid main body 20 side, which facilitates simplification of evaluations of proportional solenoid valves.

Second Embodiment

Figure 2:
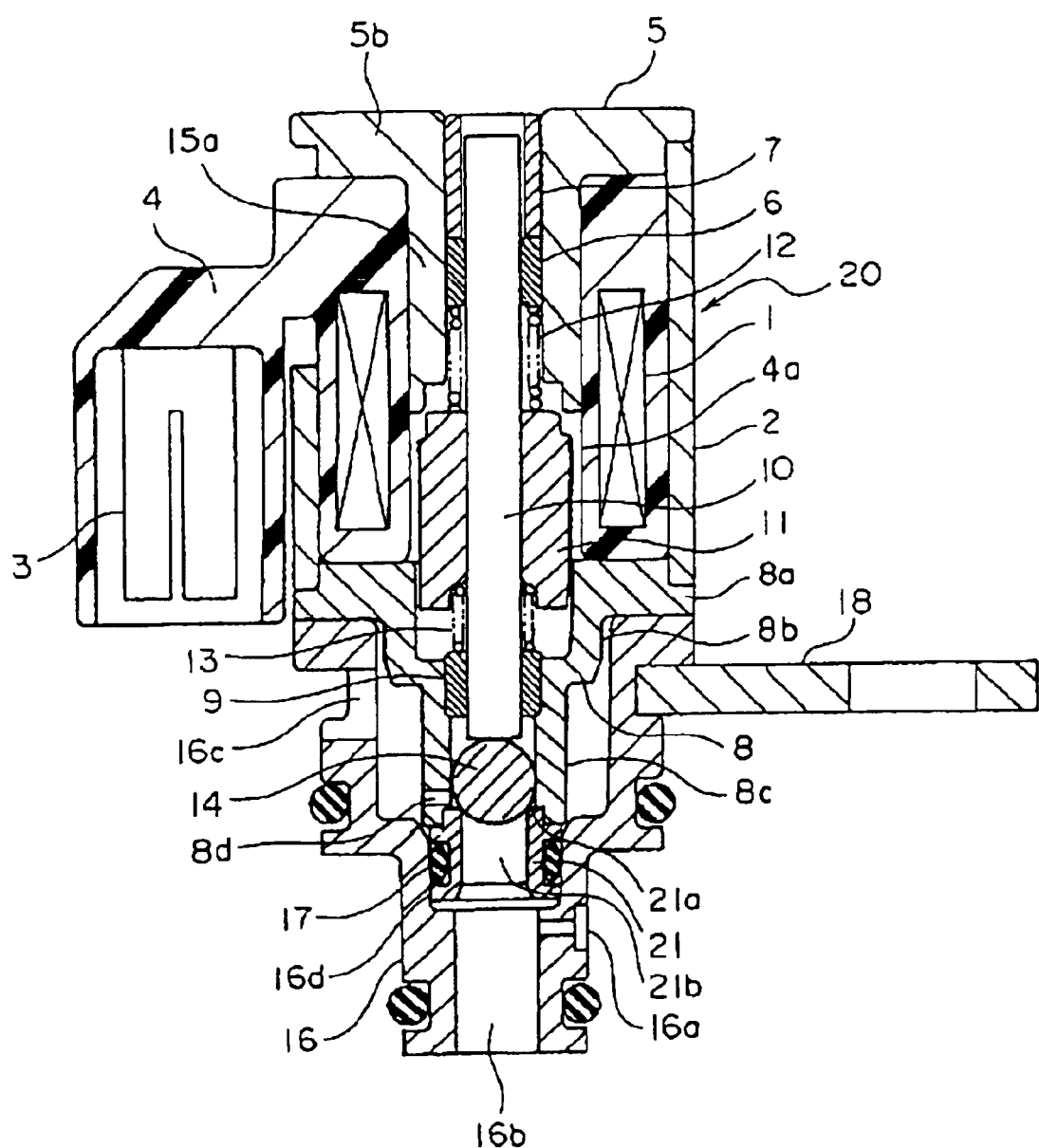
FIG. 2 is a cross-sectional view of a proportional solenoid valve according to a second embodiment of the present invention.

Next, a second embodiment of the present invention will be described. FIG. 2 is a cross-sectional view of a proportional solenoid valve according to the second embodiment. In the drawing, the valve guide portion 8c is provided with a drain-side oil flow path 8d that guides a part of the oil from the input port 16a to the drain port 16c side when the valve element 14 is set in an opened state. To a tip portion of the valve guide portion 8c, a valve seat member 21 after abutment is welded and fixed. This valve seat member 21 includes a seat portion 21a, with which the valve element 14 is brought into and out of contact, and an input/output-side oil flow path 21b. Between the inner peripheral surface of the valve seat insertion portion 16d and the valve seat member 21, a space having a predetermined size is provided, and the seal member 17, such as an O-ring made of an elastic material, is provided therein. Other constructions are the same as those in the first embodiment.

Even when the valve seat member 21 is welded to the valve guide portion 8c in that manner, it is possible to provide the same effects as in the first embodiment. Also, it is possible to weld the valve seat member 21 to the valve guide portion 8c merely by performing spot welding at several points at the outer periphery of the joining surface therebetween, which makes it possible to neglect the influence of welding distortion.

Third Embodiment

Figure 3:
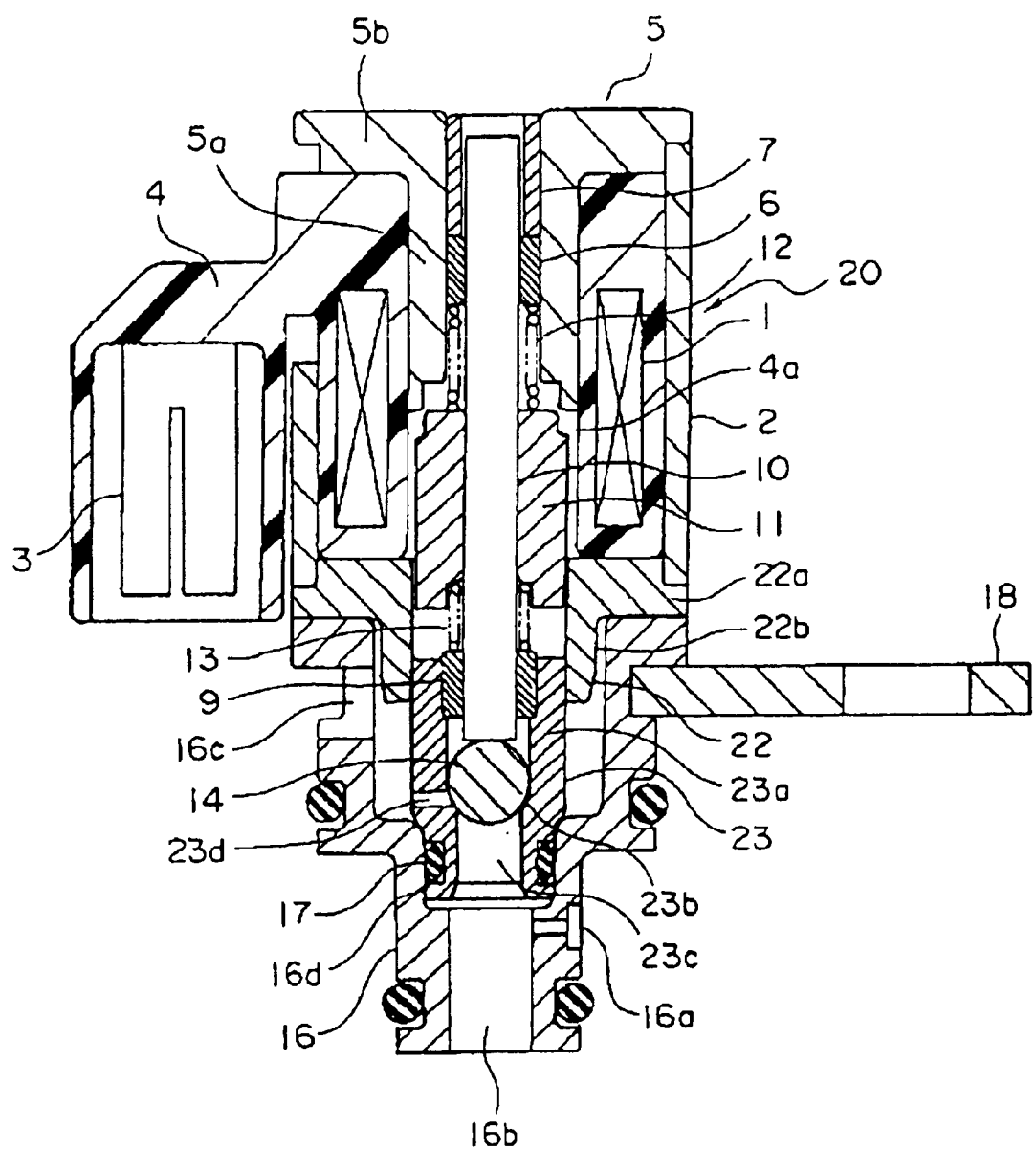
FIG. 3 is a cross-sectional view of a proportional solenoid valve according to a third embodiment of the present invention.

Next, a third embodiment of the present invention will be described. FIG. 3 is a cross-sectional view of a proportional solenoid valve according to the third embodiment of the present invention. In the drawing, a guide member 22 made of metal is coupled to the resin portion 4. This guide member 22 includes an annular-shaped flange portion 22a abutted against an end surface of the resin portion 4, and a cylindrical fit portion 22b that protrudes from the flange portion 22a. The flange portion 22a is welded to the case 2 at the outer periphery of its joining surface with the case 2.

Into the fit portion 22b, a cylindrical valve seat member 23 is fitted and fixed. This valve seat member 23 includes a valve guide portion 23a that guides the displacement of the valve member 14, a seat portion 23b which the valve element 14 is brought into and out of contact with, an input/output-side oil flow path 23c, and a drain-side oil flow path 23d.

The second plain bearing 9 is inserted into the valve guide portion 23a and fixed. Between the inner peripheral surface of the valve seat insertion portion 16d and the valve seat member 23, a space having a predetermined size is provided and the seal member 17, such as an O-ring made of an elastic material, is provided in the space. Other constructions are the same as those in the first embodiment.

Even when the valve guide portion 23a is formed integrally with the valve seat member 23 in that manner, it is possible to produce the same effects as in the first embodiment. Also, the valve guide portion 23a is formed integrally with the valve seat member 23, so that it becomes possible to further improve the positional accuracy between the valve element 14 and the seat portion 23b.

Note that, in the first to third embodiments, there was described a proportional solenoid valve of a normally high type whose output pressure is high at the time of non-energization and is decreased in accordance with an increase in applied current. However, the present invention is also applicable to a proportional solenoid valve of a normally low type whose output pressure is low at the time of non-energization and is increased in accordance with an increase in applied current. Also, the housing can be shared between two types of proportional solenoid valves.

What is claimed is:

1. A proportional solenoid valve comprising:
    a solenoid main body including a coil, a valve seat member having a seat portion, a ball-shaped valve element, a moveable member that comprises a plunger and a rod press fitted into the plunger and being contactable with the valve element and is moveable in accordance with a current applied to the coil so as to bring the valve element into and out of contact with the seat portion, and a valve guide portion that is arranged coaxially with the seat portion and contactably guides the displacement of the valve element;
    a housing that is attached to the solenoid main body so that a space is formed between the housing and the valve seat member, and forms an input/output flow path of a fluid; and
    a seal member that is made of an elastic material and is provided in the space.

2. A proportional solenoid valve according to claim 1, wherein both of the valve guide portion and the valve seat member have a cylindrical shape, and the valve seat member is fitted and fixed around an outer peripheral surface of the valve guide portion.

3. A proportional solenoid valve according to claim 1, wherein each of the valve guide portion and the valve seat member has a cylindrical shape, and the valve seat member is welded and fixed to a tip portion of the valve guide portion.

4. A proportional solenoid valve according to claim 1, wherein the valve seat member has a cylindrical shape, and the valve guide portion is formed integrally with the valve seat member.

* * * * *